US008267542B2

(12) United States Patent
Roberts et al.

(10) Patent No.: US 8,267,542 B2
(45) Date of Patent: Sep. 18, 2012

(54) APPARATUS AND METHODS FOR SELECTING LIGHT EMITTERS

(75) Inventors: John Roberts, Grand Rapids, MI (US); Chenhua You, Cary, NC (US)

(73) Assignee: Cree, Inc., Durham, NC (US)

( * ) Notice: Subject to any disclaimer, the term of this patent is extended or adjusted under 35 U.S.C. 154(b) by 201 days.

(21) Appl. No.: 12/126,079

(22) Filed: May 23, 2008

(65) Prior Publication Data

US 2009/0129074 A1 May 21, 2009

Related U.S. Application Data

(63) Continuation-in-part of application No. 11/940,437, filed on Nov. 15, 2007.

(51) Int. Cl.
*F21V 9/00* (2006.01)
*G01J 3/46* (2006.01)

(52) U.S. Cl. .......................... 362/231; 362/230; 356/402

(58) Field of Classification Search .................. 362/230, 362/231, 458; 382/162; 356/402, 405, 406, 356/416, 417, 421, 425; 209/576, 577, 580
See application file for complete search history.

(56) References Cited

U.S. PATENT DOCUMENTS

| | | | | |
|---|---|---|---|---|
| 3,504,980 A * | 4/1970 | Logan et al. | ............. | 356/405 |
| 4,278,538 A * | 7/1981 | Lawrence et al. | ............. | 209/580 |
| 5,339,963 A * | 8/1994 | Tao | ............. | 209/581 |
| 5,521,708 A * | 5/1996 | Beretta | ............. | 356/402 |
| 6,552,495 B1 | 4/2003 | Chang | | |
| 6,900,471 B1 * | 5/2005 | Wicke et al. | ............. | 257/89 |
| 7,066,623 B2 * | 6/2006 | Lee et al. | ............. | 362/230 |
| 7,354,172 B2 * | 4/2008 | Chemel et al. | ............. | 362/231 |
| 2003/0076056 A1 * | 4/2003 | Schuurmans | ............. | 315/291 |
| 2004/0218387 A1 * | 11/2004 | Gerlach | ............. | 362/231 |
| 2005/0259423 A1 | 11/2005 | Heuser et al. | | |
| 2005/0259439 A1 | 11/2005 | Cull et al. | | |
| 2006/0098077 A1 * | 5/2006 | Dowling | ............. | 347/130 |
| 2006/0215388 A1 | 9/2006 | Hamada | | |
| 2007/0216704 A1 | 9/2007 | Roberts et al. | | |
| 2007/0268694 A1 * | 11/2007 | Bailey et al. | ............. | 362/231 |
| 2008/0290004 A1 * | 11/2008 | Tsai et al. | ............. | 209/573 |

(Continued)

FOREIGN PATENT DOCUMENTS

CN 1837924 A 9/2006

(Continued)

OTHER PUBLICATIONS

Dowling, "Standards required for further penetration of solid-state lighting", LEDs Magazine Apr. 2007, http://www.ledsmagazine.com/features/4/4/10>, Last Download: Mar. 12, 2009, pp. 28-31, XP007907637.

(Continued)

*Primary Examiner* — David Crowe
(74) *Attorney, Agent, or Firm* — Myers Bigel Sibley & Sajovec

(57) ABSTRACT

Provided are devices and methods for grouping light emitters and devices including the same. Embodiments of such methods may include selecting a portion of the light emitters using a region of a multiple axis color space that is configured to represent each of a plurality of colors as at least two chromaticity coordinates. The region may be proximate a predefined point on the multiple axis color space and includes a major axis having a first length and a minor axis having a second length that is less than the first length.

23 Claims, 13 Drawing Sheets

U.S. PATENT DOCUMENTS

| | | | |
|---|---|---|---|
| 2009/0097271 A1* | 4/2009 | Chen et al. | 362/612 |
| 2009/0117672 A1* | 5/2009 | Caruso et al. | 438/7 |

FOREIGN PATENT DOCUMENTS

| | | | |
|---|---|---|---|
| JP | 2000082845 A | | 3/2000 |
| JP | 2000138037 A | | 5/2000 |
| JP | 2003297291 A | | 10/2003 |
| JP | 2007-80530 A | | 3/2007 |
| KR | 2007002211 A | * | 1/2007 |
| WO | WO 2007125623 A1 | * | 11/2007 |

OTHER PUBLICATIONS

Nichia, "Light Emitting Diode (InGan LED): Surface Mount Type LED Chromaticity Diagram", http://www.nichia.com/product/smd-color.html>, Last Download: Mar. 12, 2009 (Jan. 1, 2005) XP007907628.

Wyszecki et al., "Precision Of Color Matching for Normal Trichromats: MacAdam Ellipses", Color Science; Concepts And Methods, Quantitative Data and Formulae, pp. 306-313 (Jan. 1, 1982) XP002230956.

International Search Report and Written Opinion (18 pages) corresponding to International Application No. PCT/US2008/012549; Mailing Date: Mar. 23, 2009.

First Office Action from State Intellectual Property Office of the Peoples Republic of China Corresponding to Application No. 200880121877.9; Date of Notification: Sep. 21, 2011; 4 pages.

Office Action in Japanese Corresponding to Application No. 2010-534021; Date of Notification: Jun. 5, 2012, 2011; 4 pages.

* cited by examiner

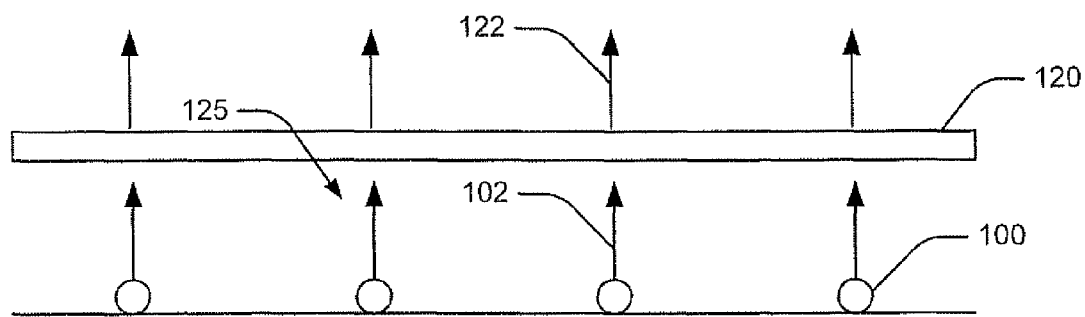
FIGURE 1
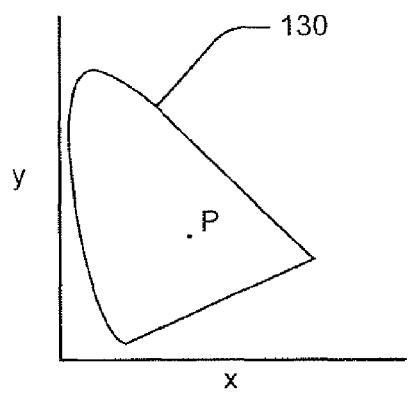 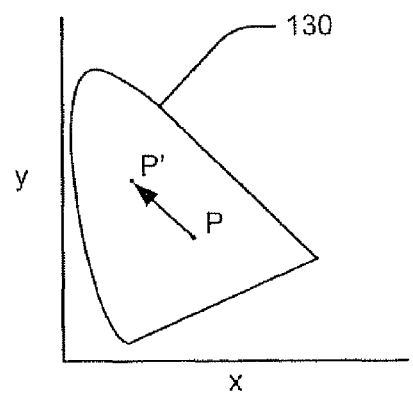
FIGURE 2A       FIGURE 2B

APPARATUS AND METHODS FOR SELECTING LIGHT EMITTERS

RELATED APPLICATIONS

This application is a continuation in part of U.S. patent application Ser. No. 11/940,437, filed on Nov. 15, 2007, in the United States Patent and Trademark Office, the disclosure of which is incorporated herein in its entirety by reference.

FIELD OF THE INVENTION

The present invention relates to lighting, and more particularly to selecting lighting components used in devices.

BACKGROUND

Panel lighting devices are used for a number of lighting applications. A lighting panel may be used, for example, as a backlighting unit (BLU) for an LCD display. Backlighting units commonly rely on an arrangement of multiple light emitters such as fluorescent tubes and/or light emitting diodes (LED). An important attribute of the multiple light emitters may include uniformity of color and/or luminance in displayed output. Presently, light emitters may be tested and grouped and/or binned according to their respective output and/or performance to improve relative uniformity among multiple light emitters. The grouping may be performed using, for example, chromaticity values, such as the x,y values used in the CIE 1931 color space that was created by the International Commission on Illumination in 1931. In this manner, each light emitter may be characterized by x,y coordinates. Emitters having similar x,y values may be grouped or binned to be used together. However, emitters having similar x,y coordinates and/or luminosity may include significantly different spectral power distributions that may adversely impact uniformity when used in conjunction with other components in a device.

SUMMARY

Some embodiments of the present invention include methods for grouping a plurality of light emitters. Some embodiments of methods may include selecting a portion of the light emitters using a region of a multiple axis color space that is configured to represent each one of multiple colors as at least two chromaticity coordinates, the region proximate a predefined point on the multiple axis color space. The region may include a major axis including a first length and a minor axis including a second length that is less than the first length.

In some embodiments, the multiple axis color space includes International Commission on Illumination (CIE) 1976. In some embodiments, the region includes an elliptical, rectangular and/or hexagonal geometry. Some embodiments provide that the major axis is oriented substantially 10 degrees clockwise from a vertical axis of the multiple axis color space. In some embodiments, a ratio of the first length to the second length is in range from 1.3 to 2.3. In some embodiments, a ratio of the first length to the second length comprises approximately 2.1.

Some embodiments include selecting a plurality of portions of the plurality of light emitters using a plurality of adjacent regions. In some embodiments, each of the regions includes a substantially similar geometry, orientation and size. Some embodiments include selecting the portion of the light emitters as a function of an application specific transmission characteristic. In some embodiments, the application specific transmission characteristic includes a transmission characteristic of a display panel.

Some embodiments include generating emitter spectral power distribution data for each of the light emitters and selecting one of multiple adjacent regions corresponding to the emitter spectral power distribution of each of the light emitters. In some embodiments, the light emitters include solid-state light emitters, incandescent lights and/or cold-cathode fluorescent lights.

Some embodiments include a computer program product for grouping a plurality of light emitters, the computer program product comprising a computer usable storage medium having computer readable program code embodied in the medium, the computer readable program code configured to carry out the methods described herein.

Some embodiments of the present invention include a device that may include multiple light emitters including a chromaticity difference maximum defined by a region of a multiple axis color space that is configured to represent each of a plurality of colors as at least two chromaticity coordinates. In some embodiments, the region is proximate a predefined point on the multiple axis color space and includes a major axis including a first length and a minor axis including a second length that is less than the first length.

In some embodiments, the multiple axis color space includes one of International Commission on Illumination (CIE) 1976 and CIE 1931. In some embodiments, the region includes an elliptical, rectangular and/or hexagonal geometry. In some embodiments, the major axis is oriented substantially 10 degrees clockwise from a vertical axis of the multiple axis color space. In some embodiments, a ratio of the first length to the second length is in range from 1.3 to 2.3. Some embodiments provide that a ratio of the first length to the second length comprises approximately 2.1.

In some embodiments, multiple portions of the light emitters include a chromaticity difference maximum defined by respective ones of multiple adjacent regions of the multiple axis color space. Some embodiments provide that each of the re-ions includes a substantially similar geometry, orientation and size. In some embodiments, a portion of the light emitters further include a maximum chromaticity difference defined as a function of an application specific transmission characteristic. In some embodiments, the application specific transmission characteristic includes a transmission characteristic of a display panel.

In some embodiments, each of the light emitters includes spectral power distribution data and is grouped into one of multiple regions corresponding to the spectral power distribution data. In some embodiments, the light emitters include solid-state light emitters, incandescent lights and/or cold-cathode fluorescent lights.

Some embodiments of the present invention include apparatus for grouping multiple light emitters. Apparatus according to some embodiments may include a chromaticity module that is configured to estimate the spectral data corresponding to each of the plurality of light emitters and a color space region definition module that is configured to define boundaries of a color space region of a multiple axis color space that is configured to represent each of multiple colors as at least two chromaticity coordinates. Some embodiments provide that the color space region includes a major axis including a first length and a minor axis including a second length that is less than the first length. Apparatus according to some embodiments may include a selection module that is configured to select a portion of the light emitters that correspond to the color space region.

Some embodiments include means for estimating front of screen (FOS) spectral data corresponding to each of the light emitters, wherein the selection module is configured to select the portion of the light emitters that correspond to the color space region via the FOS spectral data.

Some embodiments of the present invention include methods of grouping multiple light emitters. Such methods may include generating emitter raw spectral power distribution data for each of the light emitters, estimating front of screen (FOS) spectral power distribution data from an application specific transmission characteristic and the emitter raw spectral power data for each of the light emitters, and grouping each of the light emitters into one of multiple regions of a multiple axis color space that is configured to represent each of multiple colors as at least two chromaticity coordinates corresponding to the FOS spectral power distribution data of each of the plurality of light emitters. Some embodiments provide that the region includes a major axis including a first length and a minor axis including a second length that is less than the first length, such that the major axis oriented substantially different from a vertical axis of the multiple axis color space.

In some embodiments, the major axis is oriented substantially 10 decrees clockwise from the vertical axis of the multiple axis color space. In some embodiments, a ratio of the first length to the second length is in range from 1.3 to 2.3. Some embodiments provide that a ratio of the first length to the second length comprises approximately 2.1.

BRIEF DESCRIPTION OF THE DRAWINGS

The accompanying drawings, which are included to provide a further understanding of the invention and are incorporated in and constitute a part of this application, illustrate certain embodiment(s) of the invention.

FIG. 1 is a schematic diagram of a side view illustrating a plurality of light emitters configured to transmit light to one or more transmissive components according to some embodiments of the present invention.

FIGS. 2A and 2B are schematic color space chromaticity diagrams illustrating a shift in chromaticity resulting from a transmissive component as illustrated in FIG. 1 according to some embodiments of the present invention.

DETAILED DESCRIPTION OF EMBODIMENTS OF THE INVENTION

Figure 3:
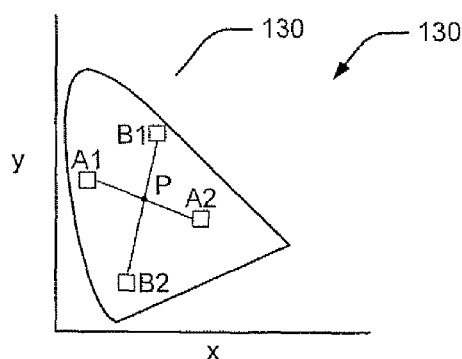
FIG. 3 is a schematic color space chromaticity diagram illustrating emitters having same chromaticity coordinates and different spectral content according to some embodiments of the present invention.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The present invention is described below with reference to flowchart illustrations and/or block diagrams of methods, systems and computer program products according to embodiments of the invention. It will be understood that some blocks of the flowchart illustrations and/or block diagrams, and combinations of some blocks in the flowchart illustrations and/or block diagrams, can be implemented by computer program instructions. These computer program instructions may be stored or implemented in a microcontroller, microprocessor, digital signal processor (DSP), field programmable gate array (FPGA), a state machine, programmable logic controller (PLC) or other processing circuit, general purpose computer, special purpose computer, or other programmable data processing apparatus such as to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Reference is now made to FIG. 1, which is a schematic side view illustrating a plurality of light emitters configured to transmit light to and/or through one or more transmissive components according to some embodiments of the present invention. Multiple light emitters 100 are configured to emit unfiltered light 102 into a cavity towards one or more transmissive components 120. It will be understood that transmissive components, as described herein, include components that may be partially and/or fully transmissive. Filtered light 122 is emitted from the transmissive components and includes the spectral characteristics of the unfiltered light 102 as modified by a filtering effect of one or more transmissive components 120. In some embodiments, some of the unfiltered light 102 that reaches one or more transmissive components 120 may partially reflect and/or scatter back into the cavity 125. The reflected light may be further reflected back into the transmissive components 120 as recycled unfiltered light (not shown) and may give rise to additional filtered light 122 from the transmissive components 120.

Light emitters 100 according to some embodiments may include, for example, cold cathode fluorescent lamps and/or solid state light emitters, such as, for example, white light emitting LED's, among others. In some embodiments, the light emitters 100 may include white LED lamps that include a blue-emitting LED coated with a fluorescing compound that may modify the wavelength of light that is emitted from the blue light emitting LED. In some embodiments, the fluorescing compound may include a wavelength conversion phosphor that converts some of the blue light emitted by the LED into yellow light. The resulting light, which is a combination of blue light and yellow light, may appear white to an observer.

In some embodiments, light emitters 100 may include an array of solid state lamps such that at least two of the solid state lamps are configured to emit light having substantially different dominant wavelengths. In some embodiments, an array of solid state emitters may include quaternary and/or tertiary additive complementary emitter combinations. For example, in some embodiments, an array of solid state lamps may include red, green and blue light emitting devices. When red, green and blue light emitting devices are energized simultaneously, the resulting combined light may appear white, or nearly white, depending on the relative intensities of the red, green and blue sources. In some embodiments, an array of solid state emitters may include binary complementary emitters such as, for example, cyan and orange light emitters.

The transmissive component 120 may include one or more layers of active and/or passive optically transmissive materials and/or components. For example, an active transmissive component 120 may include an LCD display. LCD displays may include those typically found in LCD televisions, monitors, laptop computers, and/or other electronic devices including cell phones, PDA's, personal media players and/or gaming consoles, among others. In some embodiments, the transmissive component 120 may include passive optical elements including, but not limited to diffusing and/or refracting, devices, among others.

Although discussed in the context of LCD devices, a transmissive component 120 as discussed herein is not so limited. For example, a transmissive component 120 may generally include an array of optical shutters that may be used with a backlight system that impinges light on the display screen. As is well known to those having skill in the art, an LCD display generally includes an array of liquid crystal devices that act as an array of optical shutters. Transmissive LCD displays employ backlighting using, for example, fluorescent cold cathode tubes, among others, above, beside and sometimes behind the array of LCD devices. A diffusion panel behind the LCD devices can be used to redirect and scatter the light evenly to provide a more uniform display. In some embodiments, a transmissive component 120 may include a color image such as a photograph, artwork, and/or other transmissive static graphic image such as those that may be used in the context of signs, advertisements, and/or vehicular instrument clusters, among others.

In some embodiments, an LCD display may include groups of pixels used to electronically generate patterns that may be organized into images. A pixel may include a group of multiple subpixels that may each bear a filter and an addressable LCD element that acts as a field-dependent variable density filter. The filters corresponding to each subpixel modify the white light prior to its passage into the LCD element by narrowing the spectral bandwidth of the light. In this manner, white light from a bulk area source may be rendered as discrete addressable, variable grayscale, colored subpixels.

In applications where more than one light emitter 100 is needed to achieve sufficient luminous flux in a uniformly distributed fashion, light emitters 100 may be characterized according to performance properties and physically sorted into predetermined groups and/or bins. For example, the light emitters 100 may be sorted according to chromaticity and/or luminosity values in order to achieve an acceptable difference among light emitters 100. Although several of the embodiments described herein are presented in the context of chromaticity values, luminosity values are also relevant for the same reasons as the chromaticity values, albeit to a lesser degree. If the light emitters 100 are sorted based on unfiltered light 102 alone, however, a difference of chromaticity and/or luminosity values of the filtered light 122 may be greater than that of a difference of chromaticity and/or luminosity values of the unfiltered light 102 as a result of a convolution filtering effect of the transmissive component 120 on the spectra of the unfiltered light 102. Thus, according to embodiments herein, the light emitters 100 may be sorted, grouped and/or binned according to chromaticity and/or luminosity of filtered light 122. In this regard, the uniformity of the display may be improved by factoring in the effect of the transmissive component 120 in the selection and/or grouping of the light emitters 100.

As applied herein and, specifically, to chromaticity and/or luminosity, the term "difference" may include a variety of techniques that may be used to describe variation among data values including an arithmetic difference, statistical variance, standard deviation, maximum and/or minimum ranges among others. In some embodiments, a difference may be estimated as the greatest of the differences between each of the chromaticity and/or luminosity coordinates of the multiple emitters and the average of the chromaticity and/or luminosity coordinates of all of the multiple emitters.

Reference is now made to FIGS. 2A and 2B, which are schematic color space chromaticity diagrams illustrating a shift in chromaticity resulting from a transmissive component, as illustrated in FIG. 1, according to some embodiments of the present invention. The human eye includes receptors corresponding to the three colors red, green and blue. A graphical device for associating three numbers (tristimulus values) with each color is called a color space. A mathematically defined color space known as CIE 1931 color space defines color in terms of chromaticity. Luminance may be represented by Y, which is approximately correlative of the brightness. Chromaticity may be expressed in terms of x,y parameters, which may be computed using the three tristimulus values. The tristimulus values X, Y and Z may roughly correspond to red, green and blue.

Referring to FIG. 2A, a chromaticity diagram 130 includes an outer boundary that is the spectral locus. Chromaticity of emitted light, such as the unfiltered light 102 of FIG. 1, may be characterized in terms of an x,y coordinate pair. For example, point P may represent the chromaticity of the unfiltered light 102.

Referring to FIG. 2B, the chromaticity of Filtered light 122 of FIG. 1 may be different than that of unfiltered light 102 due to a filtering effect of a transmissive component 120. The chromaticity value of filtered light 122 may be characterized in terms of a different coordinate pair, x',y', illustrated as point P'. In this regard, the chromaticity of the filtered light 122 is dependent on both the spectral content of the unfiltered light 102 and the filtering properties of the transmissive component 122. In the context of multiple light emitters, the chromaticity shift corresponding to the filtering effect is unlikely to be uniform, or even similar, among different ones of the light emitters.

The lack of uniformity in the chromaticity shift may be attributed to the limited information content of the chromaticity x,y values. For example, the chromaticity x,y values do not provide for distinctions between spectral power distributions among different emitters.

Reference is now made to FIG. 3, which is a schematic color space chromaticity diagram illustrating emitters having same chromaticity coordinates and different spectral content according to some embodiments of the present invention. The chromaticity diagram 130 illustrates a simplistic representation of two light emitters A and B having chromaticity x,y values corresponding to point P. As illustrated, light emitter A may include spectral power distribution bands correlating to chromaticity (color) values A1 and A2, which, when combined, yield chromaticity x,y values corresponding to P. Light emitter B includes spectral distribution bands corresponding to chromaticity values B1 and B2, which, when combined, yield chromaticity x,y values that also correspond to P. Note that emitters A and B have dramatically distinctive spectral content and yet are characterized by the same chromaticity x,y values at point P. Thus, although light emitters A and B are perceived as the same when viewed directly, they include significantly different spectral content.

The phenomenon illustrated in FIG. 3 may be termed as source metamerism. Metamerism describes the circumstance where two color sources having different spectral power distributions appear to be the same color when viewed side by side. The metamerism occurs because each of the three types of human eye receptors responds to the cumulative energy from a broad range of wavelengths. In this regard, many different combinations of light across all wavelengths can produce an equivalent receptor response and the same tristimulus values. Thus, two spectrally different color samples may visually match and be characterized by the same chromaticity values.

Figure 4A:
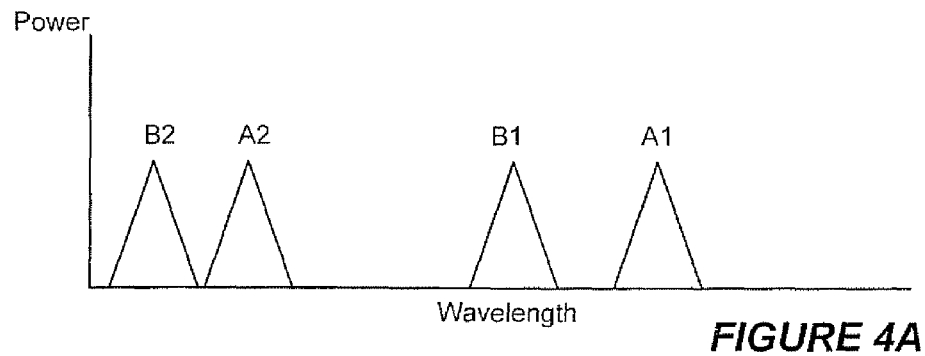
FIGS. 4A and 4C are schematic spectral power distribution graphs of points illustrated in FIG. 3 before and after application a filter function, as illustrated in FIG. 4B, according to some embodiments of the present invention.
Figure 4B:
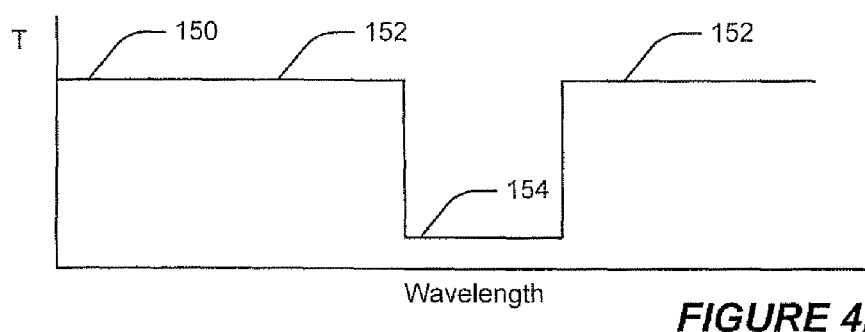
Figure 4C:
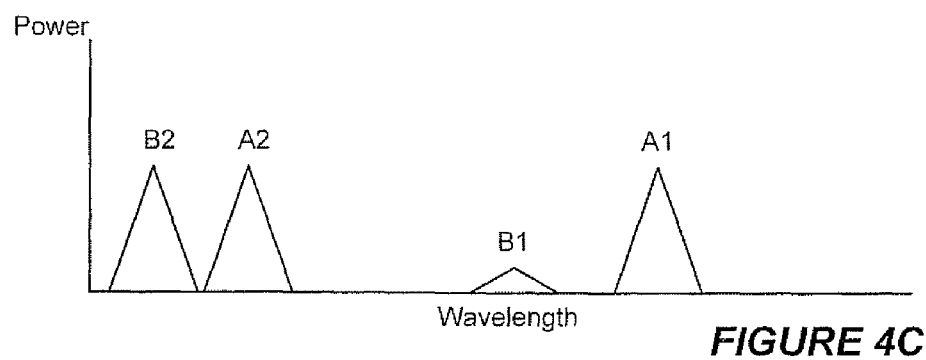

Reference is now made FIGS. 4A and 4C, which are schematic spectral power distribution graphs of points illustrated in FIG. 3 before and after application of a filter function, as illustrated in FIG. 4B, according to some embodiments of the present invention. Referring to FIG. 4A, as discussed above regarding FIG. 3, a light emitter A may include spectral emissions A1 and A2 that occur at substantially different wavelengths. Similarly, light emitter B may include spectral emissions B1 and B2 that occur at substantially different wavelengths from each other and from spectral emissions A1 and A2. In this regard, although light emitters A and B may be characterized by the same chromaticity x,y values at P, they have distinctly different spectral power distributions.

Referring to FIG. 4B, a transmissive component, such as, for example, an LCD display, may effectively apply a filtering operation that is simply illustrated as a transmittance plot 150 including high transmission portions 152 corresponding to some wavelengths of light and a low transmission portion 154 corresponding to other wavelengths of light. In some embodiments, the LCD display may include an LCD cell, a color filter array, one or more polarizers, and/or other transmissive components, among others. In this regard, as illustrated in FIG. 4C, when light emitted from light emitter A is transmitted through the transmissive component, the resulting light is effectively the same in spectral content as the emitted light because the peak of spectral emissions A1 and A2 are coincident with the high transmission portions 152 of the transmittance plot 150.

In contrast, when light emitted from light emitter B is transmitted through the transmissive component, the peak of spectral emission B1 is coincident with the low transmission portion 154 and the peak of spectral emission B2 is coincident with a high transmission portion 152. The B1 portion is not significantly transmitted so the resulting light includes a different spectral content and thus the chromaticity value shifts. Stated differently, because the peak of spectral emissions of B1 and B2 correspond to low and high transmission portions 154 and 150, the resulting light is different in spectral content than the light emitted from light emitter B. Thus, in this simple example, the difference in the chromaticity values of the unfiltered light from A and B is essentially zero and the difference in the chromaticity values in the filtered light from A and B is not zero and may significantly impact uniformity in applications such as, for example, a display. In this regard, the advantages of grouping light emitters according to chromaticity values that are defined after modification from a transmissive component are realized.

Figure 5A:
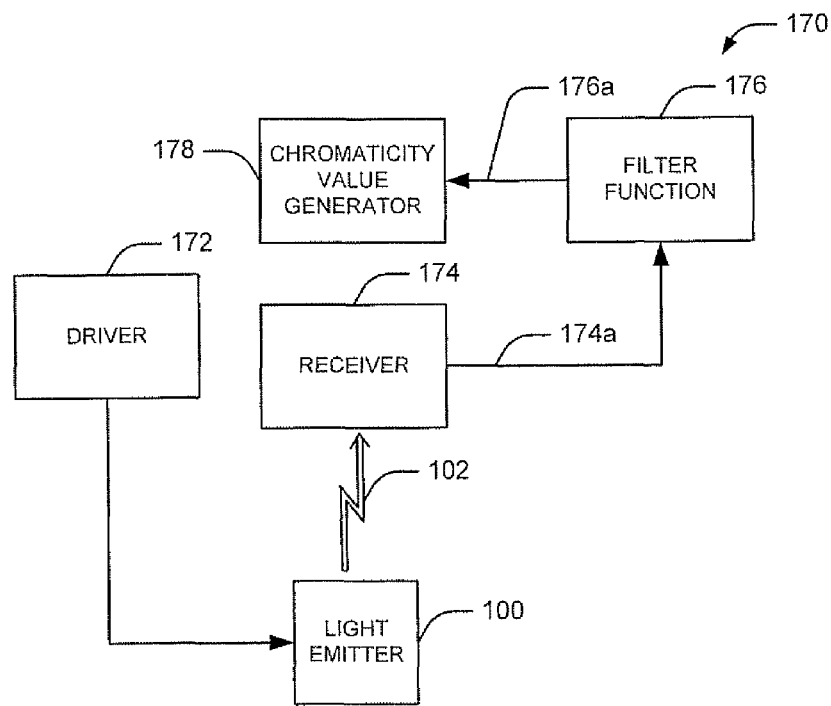
FIGS. 5A and 5B are block diagrams illustrating systems and/or operations for applying a filter function to light emitter chromaticity data according to some embodiments of the present invention.
Figure 5B:
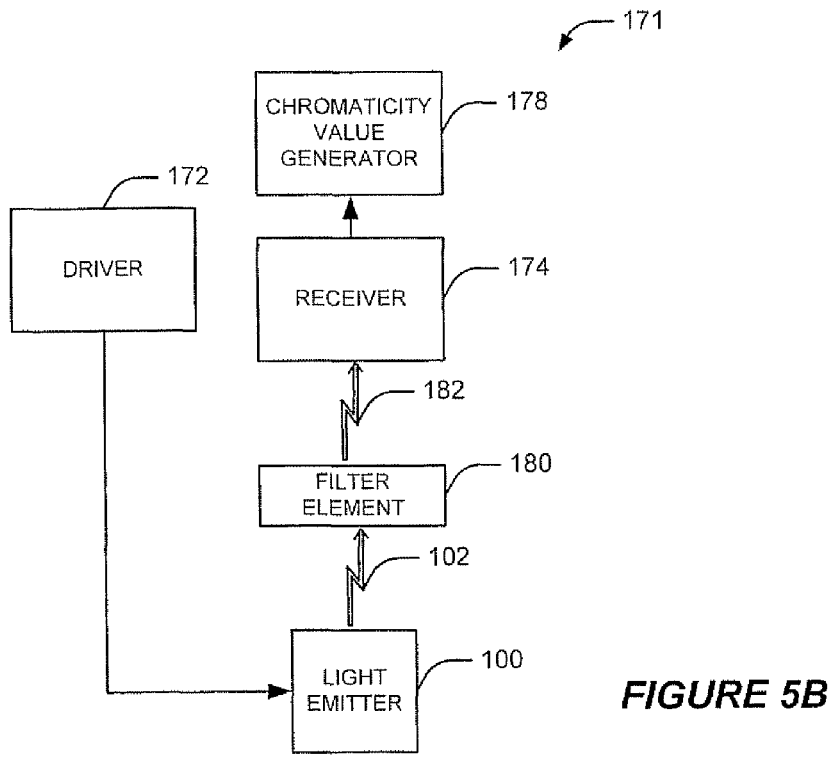

Reference is now made to FIGS. 5A and 5B, which are block diagrams illustrating operations for applying a filter function to light emitter chromaticity data according to some embodiments of the present invention. A light emitter 100 may be tested by a spectroscopic system 170 to determine a spectral power distribution. The spectral power distribution may be used to estimate tristimulus values, which may then be used to estimate chromaticity data.

A spectroscopic system 170 may include a driver 172 that is configured to drive the light emitter 100. Responsive to the driver 172, the light emitter 100 emits unfiltered light 102 which may be received by a receiver 174. The receiver 174 may generate data 174a corresponding to a spectral power distribution of the light emitter 100. In some embodiments, the receiver 174 may be configured to measure the spectral energy at multiple intervals of wavelengths between 380 nm and 780 nm, which generally define the visible spectrum. In some embodiments, the receiver 174 may provide source values 174a corresponding to the spectral power distribution of the light from the light emitter 100. Although the receiver 174 is generally presented as a unitary component, in some embodiments, the receiver 174 may include components for receiving, processing, storing and/or transmitting spectral power distribution data 174a in raw, intermediate and/or final states.

A filter function 176 is applied to the spectral power distribution data 174a that is generated by the receiver 174. In some embodiments, the filter function 176 may be a numerical and/or mathematical expression that may be used to define and/or characterize the filtering effects of transmissive devices. For example, the filter function 176 may include filtering effects corresponding to an LCD cell, films such as BEF and/or DBEF, light guide plates (LGP), the color filter array (CFA), polarizers, diffusers and/or other transmissive components that may transmit and/or modify the emitted light. In some embodiments, the filter function 176 may be expressed as spectral transmittance as a discrete function of wavelength and may include multiple values corresponding to a wavelength range from 380 nm to 780 nm, for example.

A filter function 176 corresponding to an LCD cell that includes red, green and blue subpixels may be configured to compensate for relative differences in subpixel areas and/or fill factors. For example, a pixel may devote 50% of the pixel area to a green subpixel and 25% of the pixel area to each of the red and blue subpixels. In some embodiments, the subpixel weighting may be accounted for by measuring bulk light transmittance over a broad surface of the LCD cell that includes many pixels. In this manner, the average spectral transmittance of areas of the LCD cell equal or larger than an area of a single pixel may be determined over the range of wavelengths comprising the visible spectrum.

Application of the filter function 176 may be accomplished by multiplying and/or convolving the source values determined by the receiver 174 with the filter function 176 to determine a filtered spectral power distribution 176a. In some embodiments, the filtered spectral power distribution may correspond to a front of screen spectral power distribution of the emitter as used in the device corresponding to the filter function 176. The filtered spectral power distribution 176a, as computed from unfiltered spectral power distribution data 174a and form the filter function 176, may be expressed as:

$$Fos\begin{bmatrix}780\\ \lambda\\ 380\end{bmatrix} = S\begin{bmatrix}780\\ \lambda\\ 380\end{bmatrix} \times F\begin{bmatrix}780\\ \lambda\\ 380\end{bmatrix};$$

where Fos is the filtered spectral power distribution 176a that corresponds to, for example, the filtered light at the front of the screen and includes data at intervals of wavelengths from 380 nm to 780 nm. S is the source spectral power distribution 174a that is received by the receiver and F is the filter function 176 that is applied to the source spectral power distribution.

The filtered spectral power distribution 176a may be used by a chromaticity value generator 178 to determine filtered chromaticity data corresponding to the light emitter 100 in the context of the transmissive components. The chromaticity data may be estimated by calculating filtered tristimulus values X', Y' and Z' by substituting the filtered spectral power distribution data (Fos) 176a for the source spectral power distribution (S) 174a into the tristimulus equations. The filtered chromaticity values x',y' may then be calculated from the filtered tristimulus values. In this manner, the chromaticity coordinates x',y' may be determined as a function of the front of screen and/or displayed light characteristics. The chromaticity coordinates x',y' may then be used to select, group and/or bin the light emitters 100 according to the filtered spectral power data.

Referring to FIG. 5B, a spectroscopic system 171 may include a driver 172 that is configured to drive the light emitter 100. Responsive to the driver 172, the light emitter 100 emits unfiltered light 102, which may be received by a filter element 180. In contrast with using a mathematical and/or numerical filter function applied to raw data, some embodiments use a physical filter element 118 that filters the unfiltered light 102. The filter element 180 may include a standardized physical sample and/or standard corresponding to, for example, an LCD display. In this regard, the filter element 180 may be a nominal reference cell that is substantially the same in spectral properties as the LCD cell for which the light emitter 100 is intended to be used. Differences between the filter element 180 and the LCD that the filter element 180 approximates include packaging and size, among others. For example, in some embodiments, the filter element 180 may be in the range between 25 mm and 75 mm square or a similarly sized diameter in the case of a circular filter element 180.

In application, the filter element 180 may be energized to a maximum state of transparency to realize the physical filtering effects of the LCD display. In this manner, the filtered light 182 that represents the convolution of the filter function with the source spectral data may be transmitted as filtered light 182 to the receiver 174.

The receiver 174 may generate data corresponding to a spectral power distribution of the filtered light 182. In some embodiments, the receiver 174 may be configured to measure the spectral energy at multiple intervals of wavelengths between 380 nm and 780 nm, which generally define the visible spectrum. In some embodiments, the receiver 174 is configured to provide values corresponding to a spectral power distribution of the filtered light 182. Although the receiver 174 is generally described as a unitary component, in some embodiments, the receiver 174 may include distinct and/or integrated components for receiving, processing, storing and/or transmitting spectral power distribution data in a raw, intermediate and/or final state.

The filtered spectral power distribution may be used by a chromaticity value generator 178 to determine filtered chromaticity data corresponding to the filtered light emitter 182. The chromaticity data may be estimated by calculating filtered tristimulus values X', Y' and Z' by substituting the filtered spectral power distribution data (Fos) for the source spectral power distribution (S) into known tristimulus equations and then calculating filtered chromaticity values x',y' from the filtered tristimulus values. In this manner, the chromaticity coordinates x',y' may be determined as a function of the front of screen and/or displayed light characteristics. Although discussed in the context of the CIE 1931 standard, the chromaticity data may also be expressed in terms of other color spaces such as, for example, the CIE 1976 L*, a*, b* color space and/or CIE 1976 u'v' color space, among others. The light emitters 100 can then be selected, grouped and/or binned according to the filtered chromaticity values x',y'.

Figure 6:
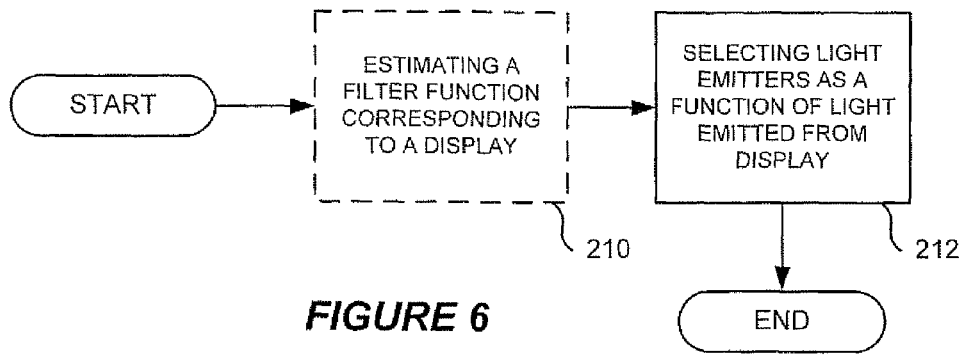
FIG. 6 is a block diagram illustrating operations for controlling light emission characteristics in a display panel according to some embodiments of the present invention.

Reference is now made to FIG. 6, which is a block diagram illustrating operations for controlling light emission characteristics in a display panel according to some embodiments of the present invention. In some embodiments, controlling light emission characteristics may include improving uniformity of light transmitted from the display. In some embodiments, controlling light emission characteristics may include providing specific chromaticity variance and/or non-uniformity other characteristics of the displayed light that may be affected via the methods, apparatus, systems, and/or computer program products described herein. Some embodiments include selecting multiple light emitters as a function of the transmissive properties of a transmissive panel and a function of the raw spectral properties of the light emitters. Some embodiments may optionally provide that a filter function corresponding to a display is estimated (block 210). In some embodiments, estimating a filter function may include measuring the display panel prior to an intended time of use. The filter function may include data corresponding to how a spectral power distribution of received light is modified as the light is transmitted through the display and/or any transmissive components therein. For example, the filter function may include data such as spectral transmittance, among others, corresponding to multiple intervals of wavelengths within the visible spectrum. The display panel may include any combination of a variety of transmissive and/or selectively transmissive components. For example, the display panel may include an LCD) cell, a color filter array, a BEF and/or DBEF film, light guide panel (LGP), one or more polarizers and/or other transmissive components among others. In some embodiments, the display may include a liquid crystal module (LCM) and/or a backlight unit (BLU).

Some embodiments provide that light emitters are selected as a function of light emitted from the display panel (block 212). In some embodiments, light emitters may be selected based on a filter function corresponding to a display panel. In such embodiments, the spectral data corresponding to unfiltered emitters may also be used in the selection of the light emitters. In some embodiments, selecting the light emitters may include generating filtered chromaticity data corresponding to each of the light emitters. In some embodiments, the filtered chromaticity data may be generated by applying a standardized filter to a spectroscopic system that is used to generate the filtered chromaticity data. In some embodiments, the standardized filter corresponds to the filter function. Selecting the light emitters may also include establishing a range of filtered chromaticity data and selecting the emitters within the range of filtered chromaticity data.

In some embodiments, the light emitters may include solid state light emitters. Solid state light emitters may include white light emitters such as, for example, blue emitting LED's with a wavelength conversion phosphor coating and/or groups of LED's that are configured to emit light having dominant wavelengths corresponding to red, green, yellow, cyan, orange and/or blue colors. In some embodiments, the light emitters may be cold cathode fluorescent lamps. By selecting the light emitters as a function of light emitted from the display, front-of-screen uniformity may be increased.

Figure 7:
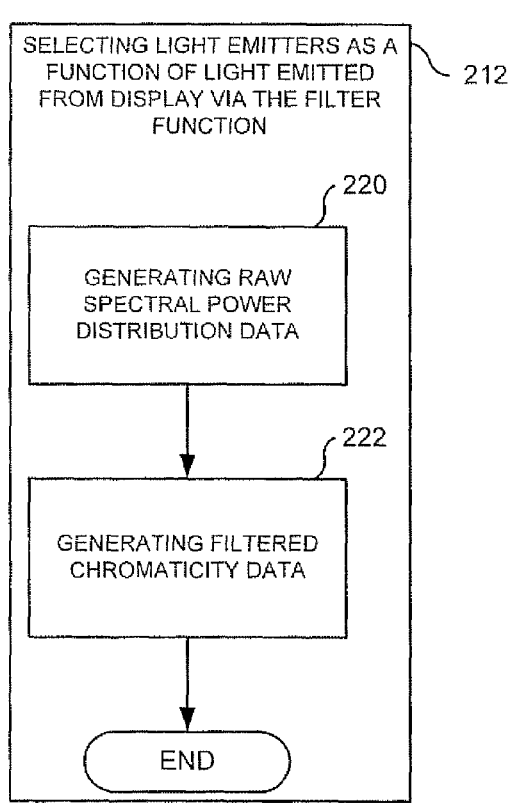
FIG. 7 is a block diagram illustrating operations for selecting multiple light emitters according to some embodiments of the present invention.

Reference is now made to FIG. 7, which is a block diagram illustrating operations for selecting multiple light emitters, as discussed above regarding FIG. 6, according to some embodiments of the present invention. Selecting light emitters (block 212) may include generating raw spectral power distribution data corresponding to each light emitter (block 220). The raw chromaticity data may be generated using a spectroscopic device that is configured to drive the light emitter and receive emitted light. The emitted light may be characterized in terms of a spectral power distribution across the visible spectrum, for example.

Figure 8:
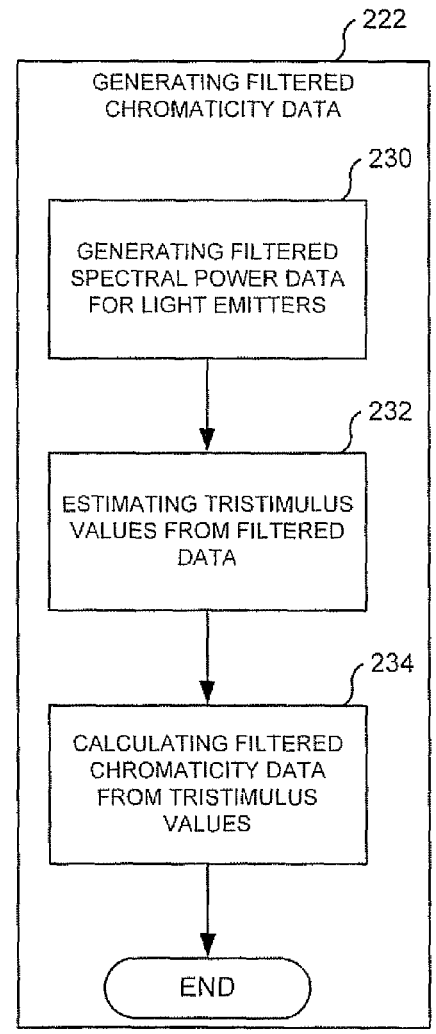
FIG. 8 is a block diagram illustrating operations for generating filtered chromaticity data according to some embodiments of the present invention.

After the raw spectral data is generated, filtered chromaticity data may be generated (block 222). Reference is now made to FIG. 8, which is a block diagram illustrating operations for generating filtered chromaticity data (block 222), as discussed above regarding FIG. 7, according to some embodiments of the present invention. Filtered spectral power distribution data for the light emitters is generated (block 230). In some embodiments, the filtered spectral power distribution data may be generated by convolving and/or multiplying the raw spectral power distribution data with the filter function to numerically estimate the spectral power distribution data corresponding to light transmitted through the filter, display, and/or transmissive components. The filtered spectral power distribution data may be used to estimate filtered light tristimulus values X', Y' and A' (block 232). The filtered tristimulus values X', Y' and Z' may be used to calculate filtered chromaticity data corresponding to the chromaticity of the light transmitted though the filter, display and/or transmissive components (block 234). For example, chromaticity x',y' values may be calculated using the filtered tristimulus values X', Y', and Z'. In this manner, the light emitters may be grouped and/or binned according to the properties of the emitters and the filtering characteristics of a device in which they will be used.

Figure 9:
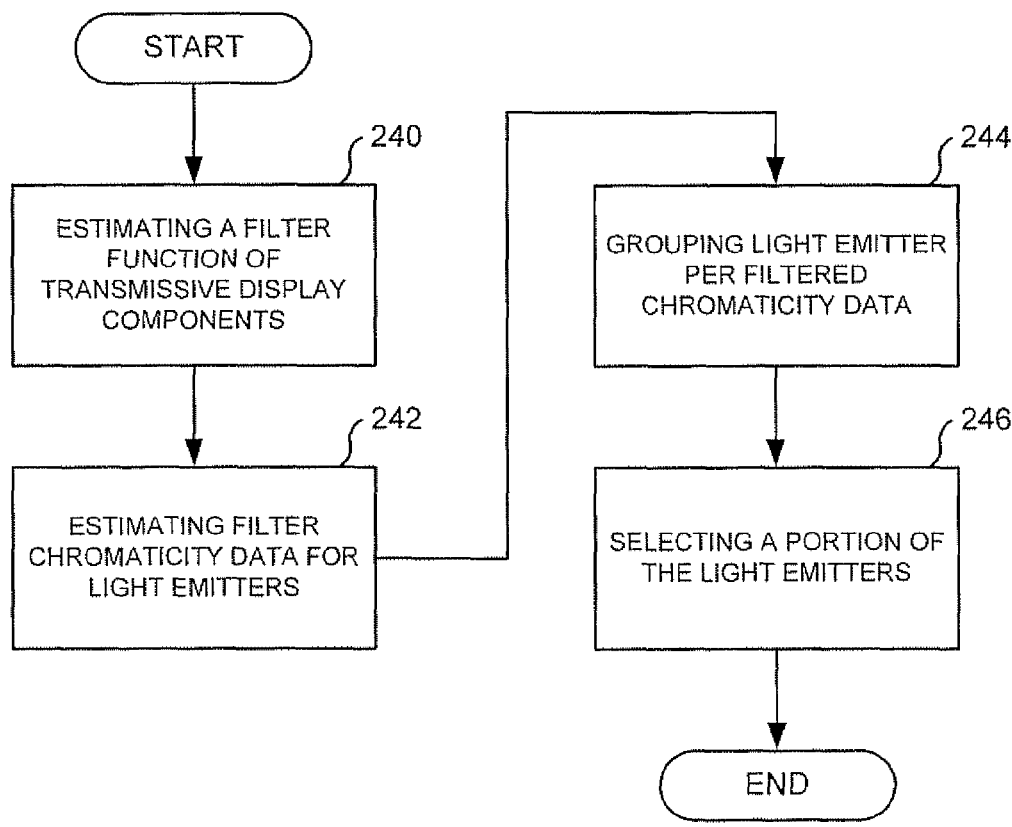
FIG. 9 is a block diagram illustrating operations for increasing display uniformity according to some embodiments of the present invention.

Reference is now made to FIG. 9, which is a block diagram illustrating operations for increasing display uniformity according to some embodiments of the present invention. A filter function of at least one transmissive display component is estimated (block 240). In some embodiments, the filter function may be estimated, for example, in terms of multiple intervals of wavelengths across the visible spectrum. For example, the filter function may be expressed as an array corresponding to intervals of wavelengths in the range between 380 nm and 780 nm. The number of array elements may be varied to provide more or less granularity in the spectral data as needed. For example, in some embodiments, the array may include an element for every 0.5 nm step from 380 nm to 780 nm. In some embodiments, the array may include an element for every 1.0 nm step from 380 nm to 780 nm.

Filtered chromaticity data is estimated for each of a plurality of light emitters (block 242). In some embodiments, the filtered chromaticity data may include generating spectral data via a filter that corresponds to the filter function. In some embodiments, the filtered chromaticity data may include numerically and/or mathematically applying the filter function to raw spectral data corresponding to the light emitters.

The light emitters may be grouped according to the filtered chromaticity data (block 244). For example, light emitters including filtered chromaticity data within defined ranges and/or bins may be grouped together to improve the uniformity of the light transmitted through the display components. A portion of the light emitters corresponding to a group and/or bin are selected for use in a backlight unit in the backlit display panel (block 246). Although presented in the context of a backlight unit, the methods disclosed herein are applicable to edgelit displays and edgelight units used therein.

Referring back to FIG. 1, devices as disclosed herein may include multiple light emitters 100 that include a first chromaticity difference corresponding to the difference in chromaticity of unfiltered light 102 emitted from the multiple light emitters. The multiple light emitters may also include a second chromaticity difference corresponding to the difference in chromaticity of filtered light 122, such that the second chromaticity difference is less than the first chromaticity difference. In some embodiments, devices may include an optical element 120 that corresponds to the filter function and receives the unfiltered light 102. The optical element 120 may also be configured to transmit filtered light 122 corresponding to the chromaticity and/or spectral properties of the unfiltered light 102 and the optical element.

Figure 10:
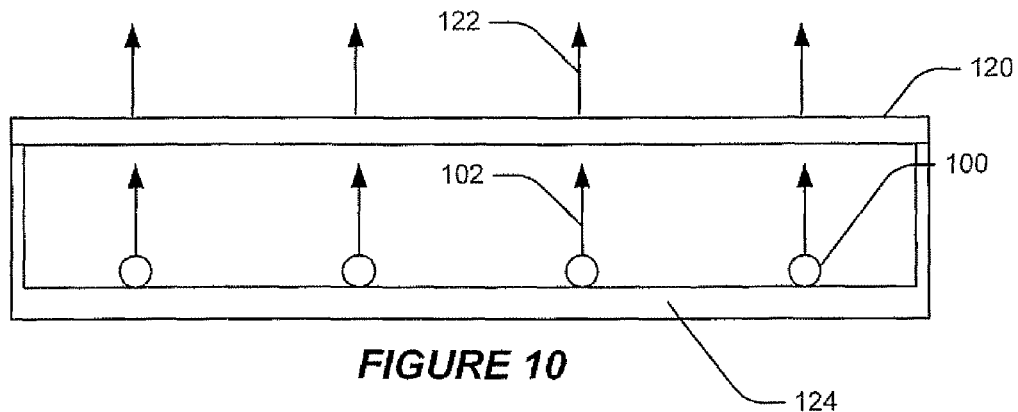
FIG. 10 is a schematic diagram of a side view of a device according to some embodiments of the present invention.

Reference is now made to FIG. 10, which is a schematic diagram of a side view of a device according to some embodiments of the present invention. The multiple light emitters 100 may be supported by a backlight unit housing 124 and/or components thereof. In some embodiments, the backlight unit housing 124 may include additional optical and non-optical components. For example, the backlight unit housing 124 may include one or more diffusers and/or reflectors and/or structural features for mounting such components.

Figure 11:
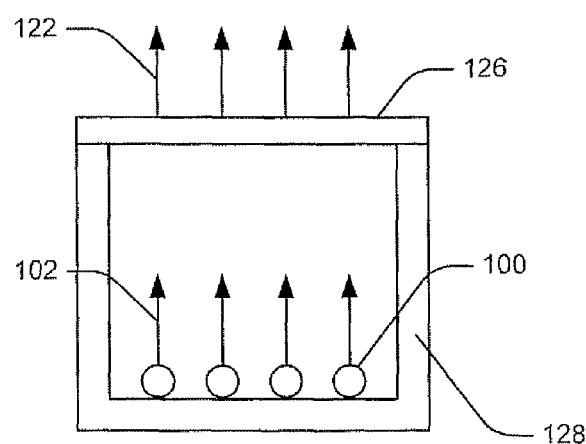
FIG. 11 is a schematic diagram of a side view of a device according to other embodiments of the present invention.

Reference is now made to FIG. 11, which is a schematic diagram of a side view of a device according to other embodiments of the present invention. Some embodiments may include a fixture housing 128 and/or components thereof that are configured to support the multiple light emitters 100 in a light fixture. In some embodiments, the optical element includes a lighting diffuser 126.

Figure 12:
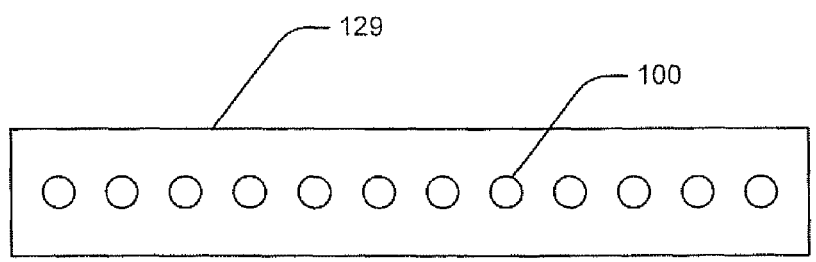
FIG. 12 is a schematic diagram of a side view of a device according to yet other embodiments of the present invention.

Reference is now made to FIG. 12, which is a schematic diagram of a device according to yet other embodiments of the present invention. Some embodiments include a support/retention structure 129 that is configured to support the multiple light emitters 100 during transportation, storage and/or dispensing. For example, a support/retention structure 129 may include a tape and/or reel configured to receive, support, store, and/or dispense the multiple light emitters 100. In this regard, the multiple light emitters that are selected, grouped and/or binned according to filtered chromaticity may be provided in commercially beneficial packaging. In some embodiments, a support/retention structure 129 may include a rigid and/or flexible printed circuit board (PCB) strip on which multiple light emitters 100 are mounted prior to use.

Figure 13:
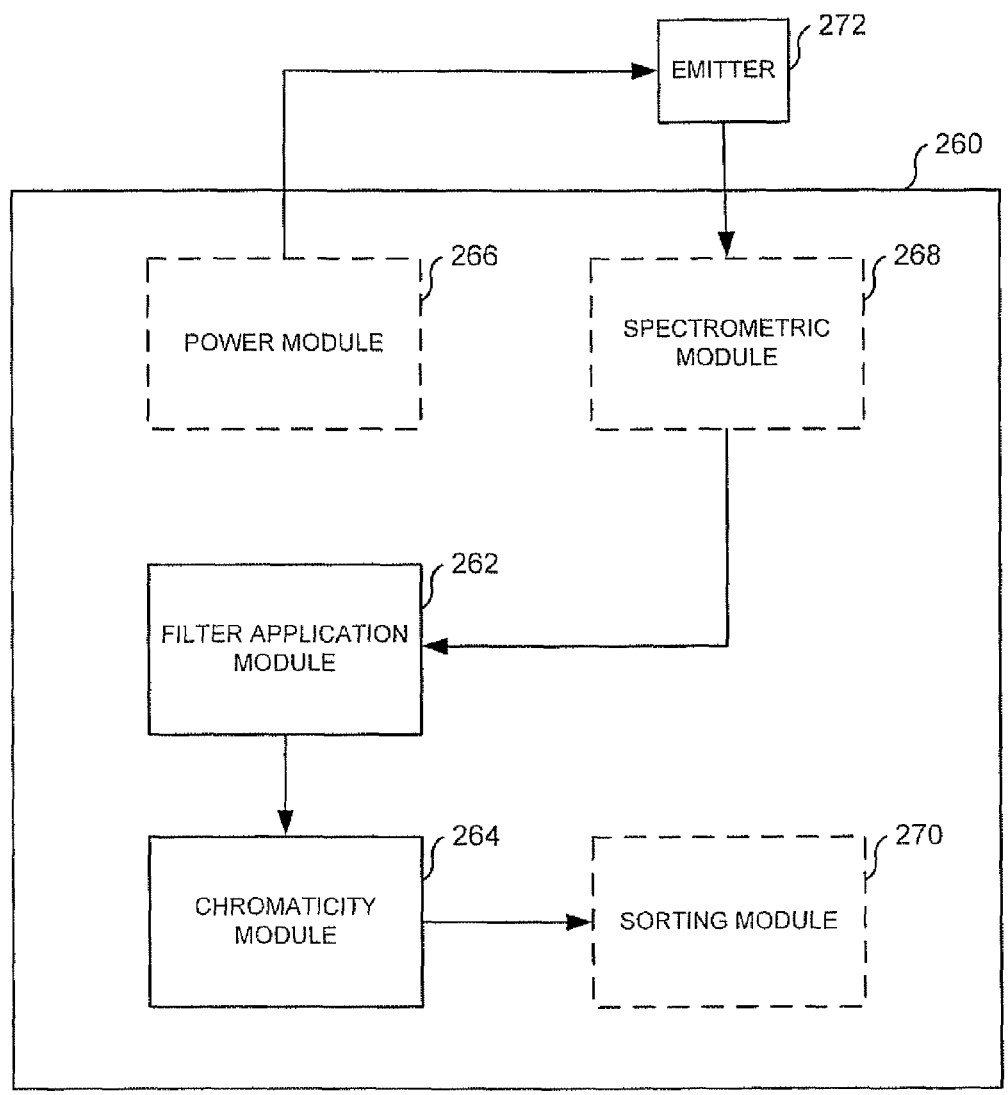
FIG. 13 is a block diagram illustrating an apparatus for selecting light emitters based on intended use according to some embodiments of the present invention.

Reference is now made to FIG. 13, which is a block diagram illustrating an apparatus for selecting light emitters based on intended use according to some embodiments of the present invention. A selecting apparatus 260 includes a filter application module 262 that is configured to apply a filter function to raw spectral data corresponding to each of multiple light emitters. The filter function may correspond to one or more transmissive components through which emitted light may be transmitted. The one or more transmissive components may correspond to an intended use for the light emitters. In this manner, the filter application module 262 may be configured to generate filtered spectral data corresponding to each of the light emitters.

A selecting apparatus 260 may include a chromaticity module 264 that is configured to estimate chromaticity values corresponding to each of the light emitters. The chromaticity values may be determined using the filtered spectral data that is generated by the filter application module.

Some embodiments of a selecting apparatus 260 may optionally include a power module 266 that is configured to provide power to each of the light emitters. In some embodiments, the power module may be configured to provide power across a range of power levels.

A selecting apparatus 260 may optionally include a spectrometric module 268 that is configured to estimate the raw spectral data corresponding to each of the light emitters. The raw spectral data may be used by the filter application module 262 to estimate the filtered spectral data. A selecting apparatus 260 may optionally include a sorting module 270 that is configured to sort the light emitters into multiple bins and/or groups corresponding to chromaticity values that may be generated in the chromaticity module 264.

In addition to using the filtered spectral data for sorting and/or grouping light emitters, the inventors discovered further techniques for reducing non-uniformity within groups of light emitters. In some embodiments, such techniques may be used in isolation and/or in combination with the techniques discussed above.

Figure 14:
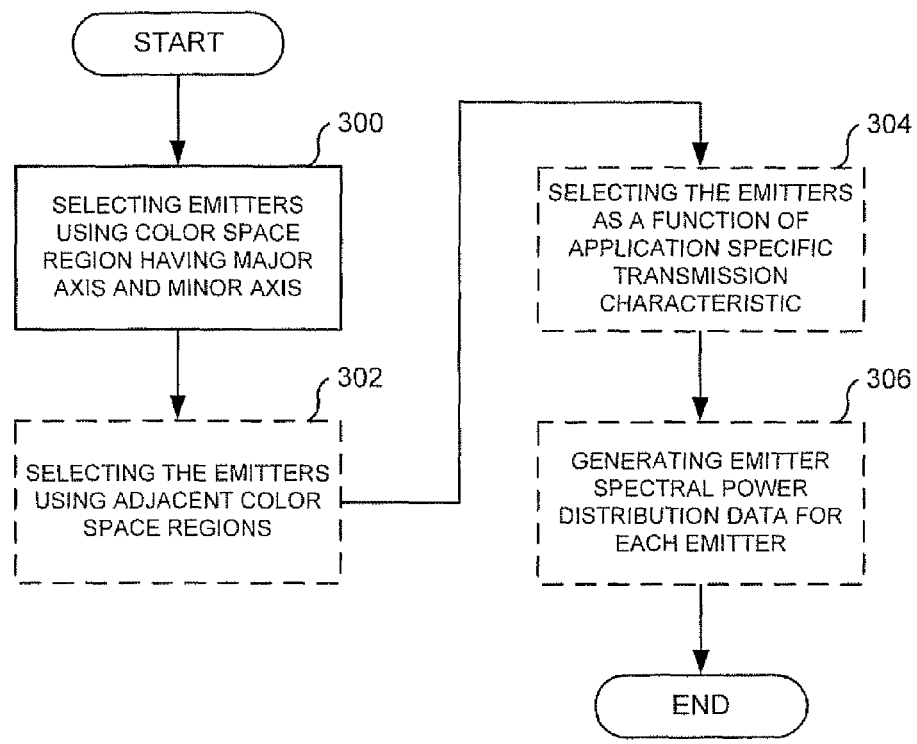
FIG. 14 is a block diagram illustrating operations for grouping light emitters according to some embodiments of the present invention.

Reference is now made to FIG. 14, which is a block diagram illustrating operations for groupings light emitters according to some embodiments of the present invention. Operations include selecting light emitters using a multiple axis color space region including major and minor axes (block 300). The multiple axis color space may be configured to represent each of multiple colors as, for example, two chromaticity coordinates. As discussed above, examples of a multiple axis color space may include a mathematically defined color space such as the CIE 1931 color space, which defines color in terms of chromaticity. According to the CIE 1931 color space, chromaticity may be expressed in terms of x, y parameters and luminance may be represented by Y, which is approximately correlative of the brightness. In addition to the CIE 1931 color space, the chromaticity data may be expressed in terms of other color spaces such as, for example, the CIE 1976 L*, a*, b* color space and/or CIE 1976 L', u', v' color space, among others. Some embodiments provide that the light emitters may include solid-state light emitter, incandescent lights and/or cold-cathode fluorescent lights.

The CIE 1931 color space is a substantially non-uniform color space and thus bin regions that are substantially equal in area may include undesirable chromaticity differences as perceived that otherwise might be eliminated using a different approach. In this regard, the CIE 1976 L, u', v' color space is a more perceptually uniform color space and thus light emitters characterized, binned and/or grouped therein may improve effective uniformity. In some embodiments, the CIE 1976 L, u', v' color space may be used in combination with the filtered spectral data corresponding to FOS data.

Some embodiments provide that further optimization may provide improved uniformity within a constraint of reducing and/or minimizing the number of bins by determining ideal bin sizes, geometries, orientations and/or aspect ratios. In this regard, it was discovered that Macadams ellipses represented in the 1976 L, u', v', color space close to CIE Standard Illuminant D65 ("D65") include specific aspect ratios and orientations that may improve uniformity of emitters within groups defined therein. Two points in a two-dimensional chromaticity space are considered to have about the same chromaticity if one point is within a seven step Macadam ellipse of the other point or vice versa. A Macadam ellipse is a closed re-ion around a center point in a two-dimensional chromaticity space that encompasses all points that are visually indistinguishable from the center point. A seven-step Macadam ellipse captures points that are indistinguishable to an ordinary observer within seven standard deviations.

Accordingly, some embodiments may include geometries having similar aspect ratios and can be configured to map multiple non-overlapping regions. For example, rectangular and/or elongated hexagonal shaped bins including aspect ratios consistent with the aspect ratios and orientations of the Macadams ellipses may improve uniformity of emitters within the groups defined therein. In this manner, a substantial portion of the u', v' color space may be defined using substantially uniform bin shapes and/or sizes while reducing a bin count and limiting the emitter non-uniformity within each group. The ratio, shape and/or size may vary depending on the application specific uniformity requirements.

In some embodiments, the region includes an elliptical, quadrilateral and/or hexagonal geometry. Some embodiments provide that a region including a quadrilateral geometry may include a parallelogram.

Some embodiments provide that the major axis may have a first length and the minor axis may have a second length that is less than the first length. In some embodiments, a ratio of the first length to the second length may include a ratio in a range from 1.3 to 2.3. Some embodiments provide that the ratio of the first length to the second length is approximately 2.1.

In some embodiments, the major axis of the region may be oriented at some angle relative to a vertical axis of the multiple axis color space. Some embodiments provide that the major axis of the region may be oriented substantially ten degrees from the vertical axis of the multiple axis color space.

In some embodiments, selecting the light emitters may include selecting the light emitters as a function of an application specific transmission characteristic of an environment in which the light emitters are designated to be used. For example, in some embodiments, an application specific transmission characteristic may include a transmission characteristic of a display panel.

Operations may include generating emitter spectral power distribution data for each of the light emitters (block 306). In some embodiments, emitter spectral distribution data may be used to select one of multiple adjacent regions corresponding to the emitter spectral power distribution of each of the light emitters (block 302). For example, some embodiments provide that the multiple axis color space may be subdivided into multiple adjacent regions that correspond to different chromaticity data. In some embodiments, the regions may correspond to a chromaticity center point and may be defined by boundary functions. In this regard, each of the light emitters may be grouped into one of the multiple regions corresponding to the spectral power distribution data that may include chromaticity and/or luminosity.

Figure 15:
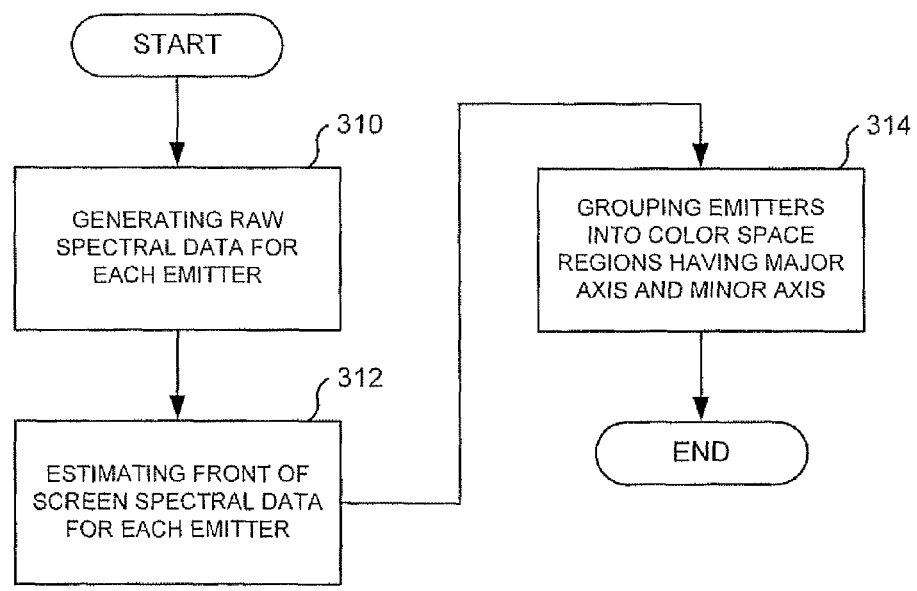
FIG. 15 is a block diagram illustrating operations for grouping light emitters according to some embodiments of the present invention.

Reference is now made to FIG. 15, which is a block diagram illustrating operations for grouping light emitters according to some embodiments of the present invention. Operations include generating raw spectral power distribution data for each of the light emitters (block 310). Some embodiments include estimating front of screen (FOS) spectral power distribution data for each light emitter (block 312). In some embodiments, the FOS spectral power distribution data may be estimated by combining an application specific transmission characteristic with the raw spectral power distribution data of each of the light emitters.

Operations may include grouping emitters into regions of a multiple axis color space that include a major axis and a minor axis (block 314). The multiple axis color space may be configured to represent each of a plurality of colors as at least two chromaticity coordinates corresponding to the FOS spectral power distribution data of each of the light emitters. In some embodiments, the major axis of each of the regions may include a first length and the minor axis of each of the regions may include a second length that is less than the first length.

Some embodiments provide that the major axis is oriented substantially different than a vertical axis of the multiple axis color space. In some embodiments, the major axis is oriented substantially ten degrees clockwise from the vertical axis of the multiple axis color space. Some embodiments provide that a ratio of the first length to the second length is in a range from 1.3 to 2.3. In some embodiments, the ratio may be approximately 2.1.

Figure 16A:
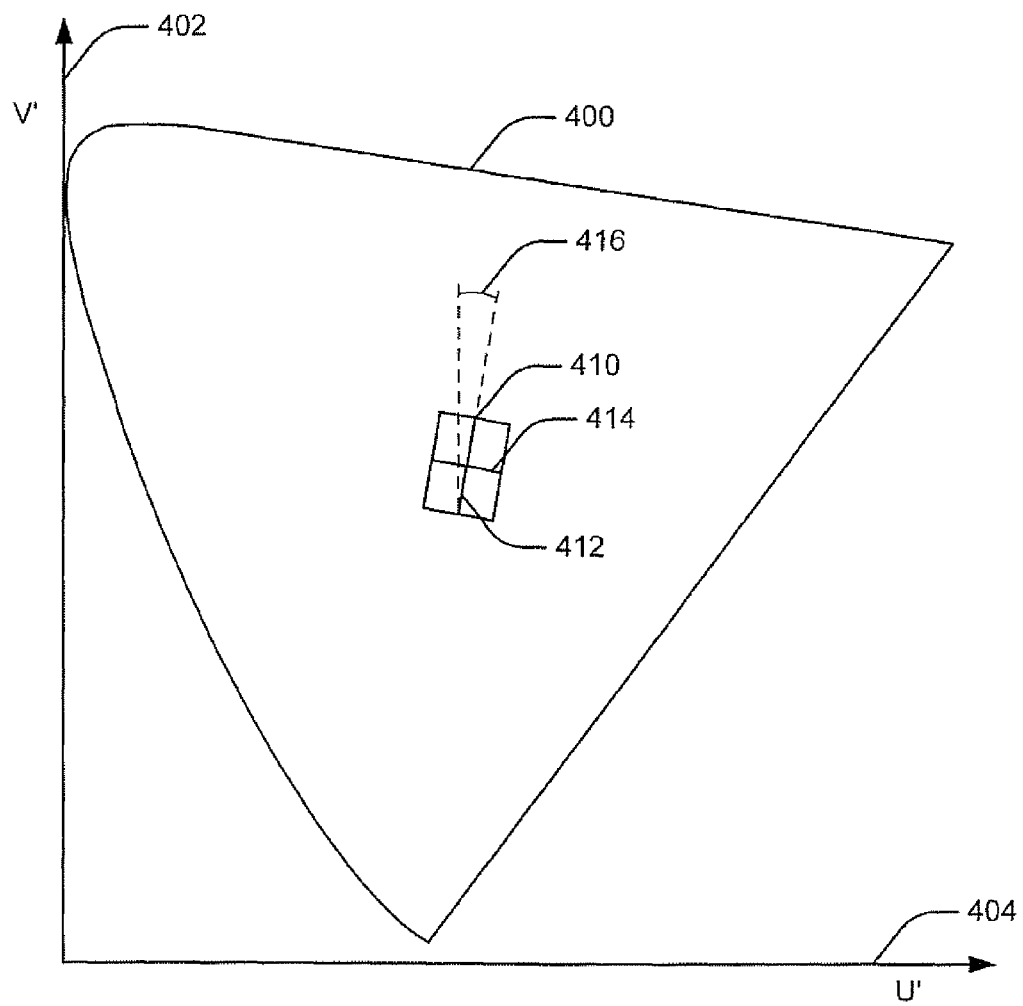
FIGS. 16A-C are schematic graphs illustrating regions in a multiple axis color space according to some embodiments of the present invention.
Figure 16B:
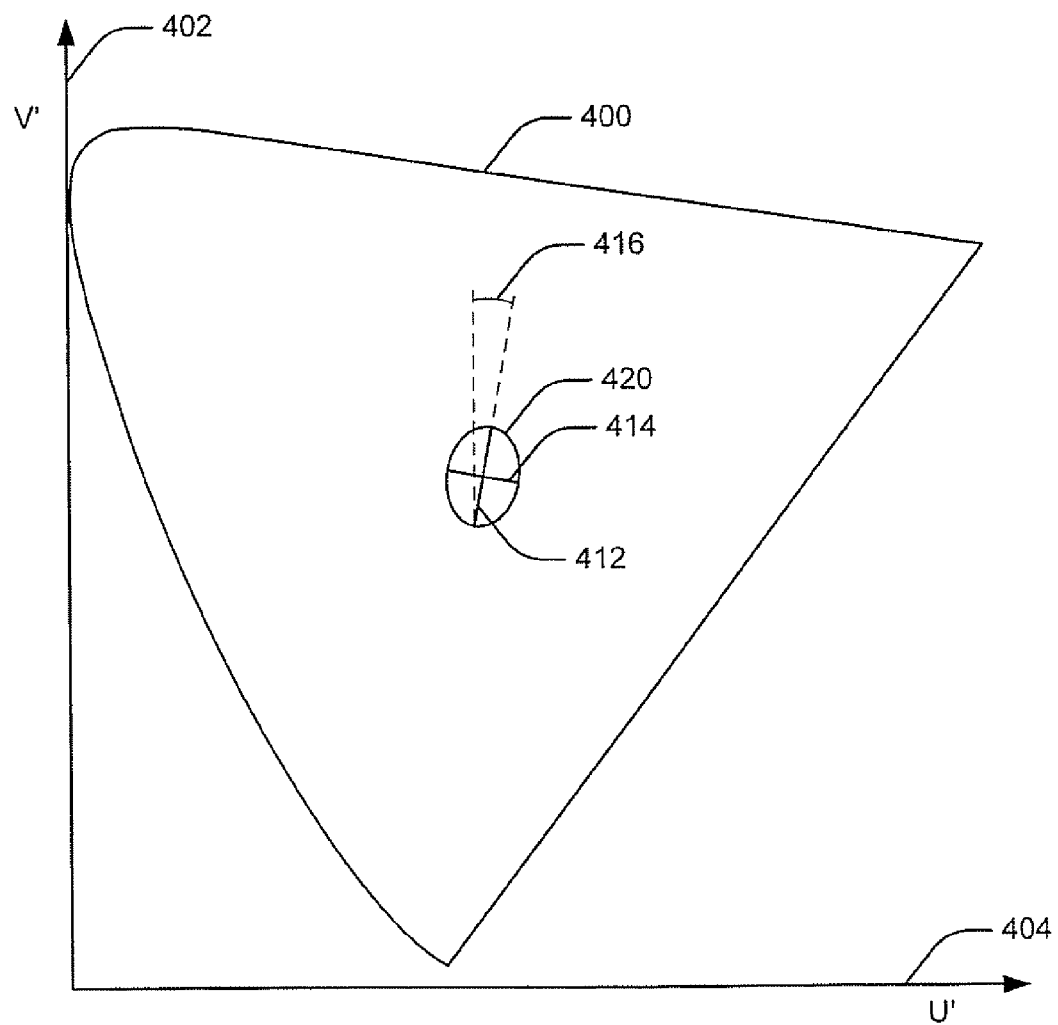
Figure 16C:
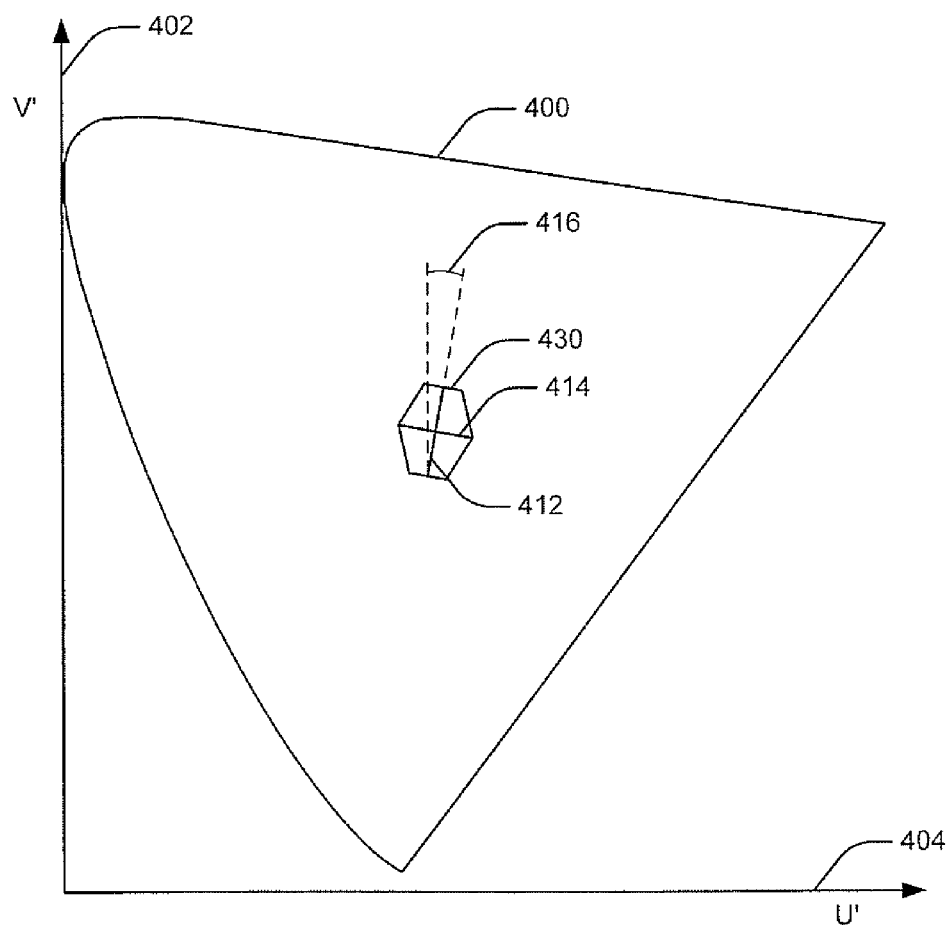

Reference is now made to FIGS. 16A-C, which are schematic graphs illustrating regions in a multiple axis color space according to some embodiments of the present invention. Referring to FIG. 16A, a multiple axis color space 400 is defined in terms of u', v' coordinates, such as, for example, in a CIE 1976 L, u', v' color space. In this regard, the graph may include a u' axis 404 and a v' axis 402. A quadrilateral region 410 in the multiple axis color space 400 may be defined in terms of a center point and/or one or more boundary values, equations, and/or functions. The quadrilateral region 410 includes a major axis 412 having a first length and a minor axis 414 having a second length that is less than the first length. In some embodiments, the quadrilateral region 410 may be oriented such that the major axis 412 may be angularly displaced from the vertical v' axis 402. Some embodiments provide that the angular displacement 416 is approximately ten degrees. In some embodiments, the quadrilateral region 410 may be a parallelogram, including for example, a rectangle.

Referring to FIG. 16B, an elliptical region 420 in the multiple axis color space 400 may be defined in terms of a center point and/or one or more boundary values, equations and/or functions. In some embodiments, the elliptical region 420 may include the major axis 412 and minor axis 414 having first and second length characteristics similar to the quadrilateral region 410 discussed above. Some embodiments provide that the elliptical region 420 may be oriented to provide a similar angular displacement 416 as the quadrilateral region 410. Some embodiments include a multiple axis color space 400 that may include a hexagonal region 430, as illustrated in FIG. 16C.

Figure 17:
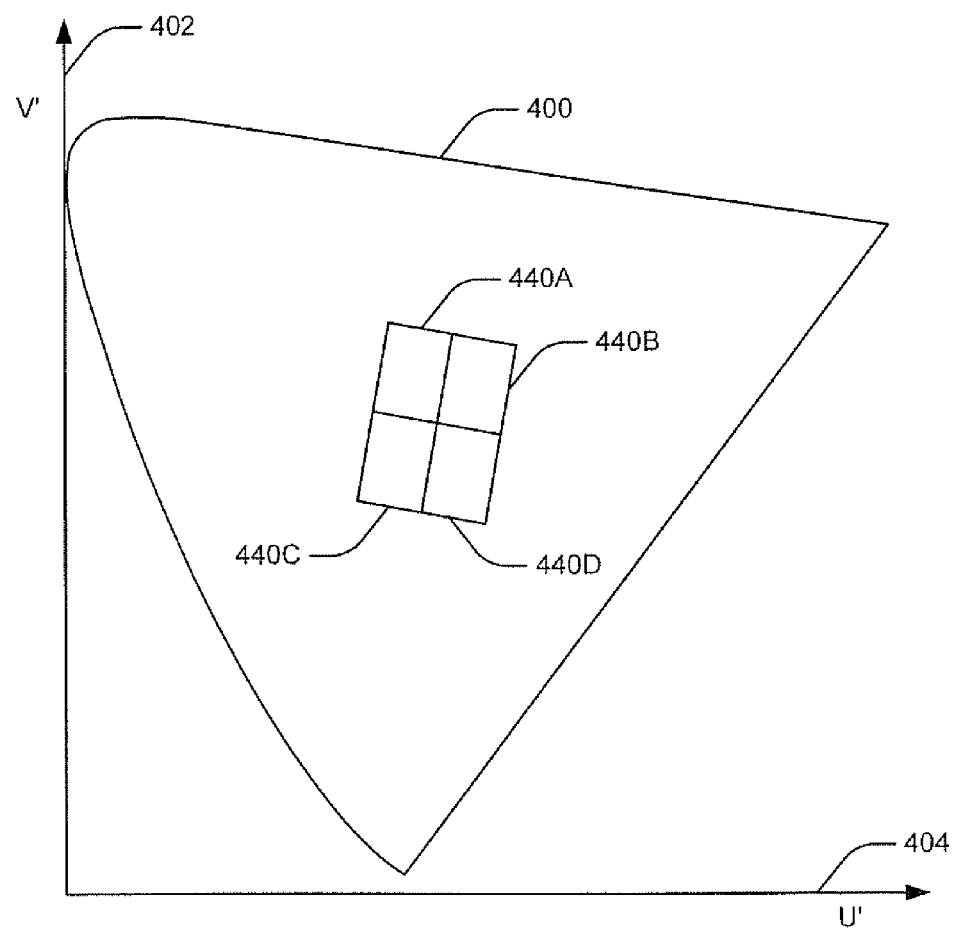
FIG. 17 is a schematic graph illustrating multiple adjacent regions in a multiple axis color space according to some embodiments of the present invention.

Brief reference is now made to FIG. 17, which is a schematic graph illustrating multiple adjacent regions 440A-D in a multiple axis color space 400 according to some embodiments of the present invention. The regions 440A-D may be defined in terms of respective center points and/or boundary values, equations, and/or functions. In this manner light emitters that include spectral power distribution data corresponding to different ones of the regions 440A-D may be grouped according, to their corresponding regions 440A-D.

In some embodiments, the regions 440A-D may be configured to define different area sizes of the multiple axis color space 400 according to a the chromaticity variation ranges defined for groups of emitters corresponding to each of the regions 440A-D. For example, if a group of emitters includes a narrow range of chromaticity values, then corresponding regions 440A-D may be defined to include a relatively small area of the multiple axis color space 400. In this regard, as the size of the regions 440A-D decreases, the number or regions 440A-D may increase to group multiple light emitters having spectral power distribution data corresponding to a portion of multiple axis color space 400. Accordingly, if a group of emitters includes a wide range of chromaticity values, then corresponding regions 440A-D may be defined to include a relatively large area of the multiple axis color space 400. Although the regions 440A-D are illustrated as substantially rectangular, as discussed above regard FIGS. 16B and 16C, regions may include elliptical, hexagonal and/or polygonal geometries, among others. Some embodiments provide that combinations of regions including different geometries may define the multiple axis color space 400 to provide specific grouping characteristics corresponding to the spectral power distribution data of a light emitters.

Figure 18:
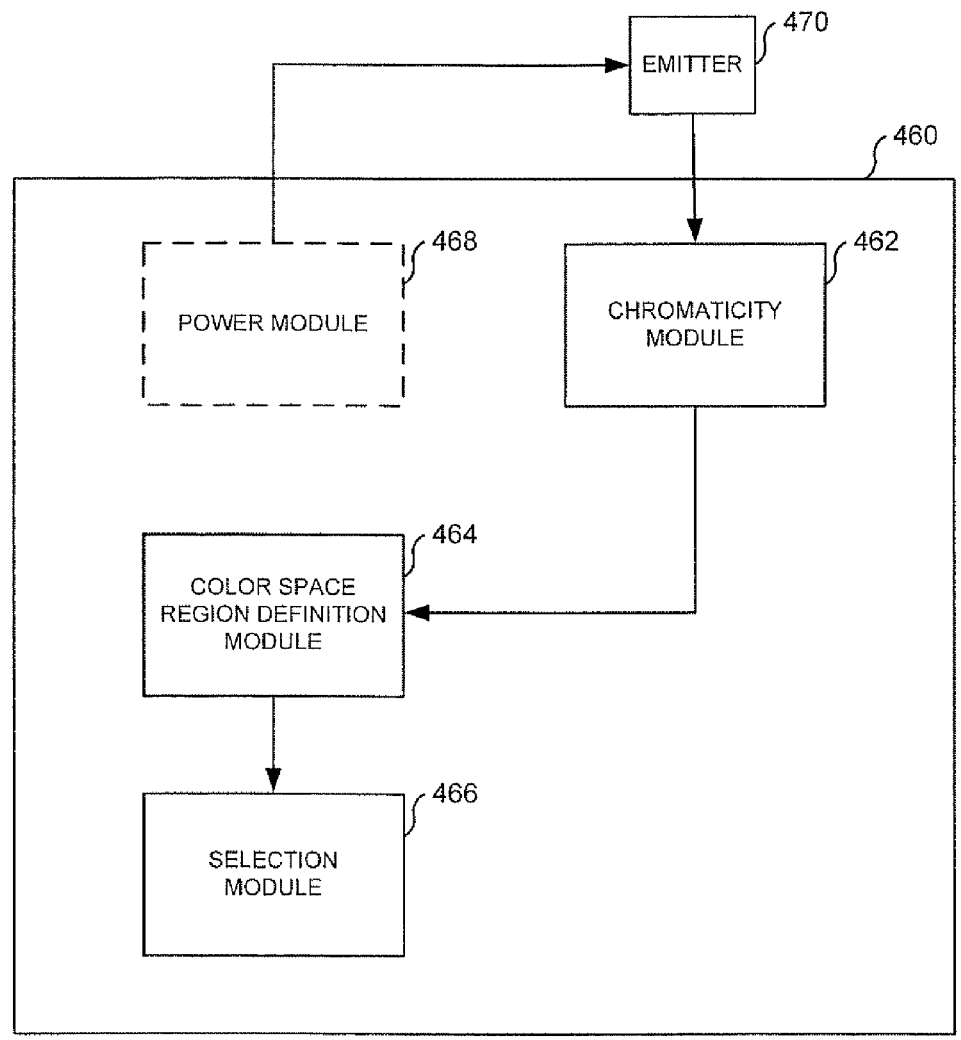
FIG. 18 is a block diagram illustrating an apparatus for grouping light emitters according to some embodiments of the present invention.

Reference is now made to FIG. 18, which is a block diagram illustrating an apparatus 460 for grouping light emitters according to some embodiments of the present invention. In some embodiments, the apparatus 460 includes a chromaticity module 462 that is configured to estimate the spectral data corresponding to each of a batch and/or set of light emitters 470. Some embodiments provide that the spectral data may include chromaticity and/or luminance values, among others. In some embodiments, the apparatus 460 may optionally include a power module 468 that is configured to drive the emitters 470. Some embodiments provide that the power module 468 may be configured to drive the emitters 470 at one or more currents, voltages, and/or duty cycles to generate varying output levels of the emitters 470.

In some embodiments, the apparatus 460 may include a color space region definition module 464 that is configured to define boundaries of a color space region of a multiple axis color space. Some embodiments provide that the multiple axis color space is configured to represent each of a plurality of colors as at least two chromaticity coordinates. In some embodiments, the color space region may include a major axis including a first length and a minor axis including a second length that is less than the first length. In some embodiments, the color space definition module 464 may be configured to define boundaries corresponding to multiple color space regions. Some embodiments provide that the multiple color space regions are adjacent one another.

In some embodiments, the apparatus 460 includes a selection module that is configured to select a portion of the light emitters 470 that correspond to the color space region. Some embodiments provide that the selection module 460 may select multiple portions of the light emitters 470 corresponding to multiple color space regions. In some embodiments, FOS data may be used in conjunction with the spectral data as criteria for selecting the portion(s) of light emitters 470 corresponding to the multiple color space region(s).

In the drawings and specification, there have been disclosed typical embodiments of the invention and, although specific teems are employed, they are used in a generic and descriptive sense only and not for purposes of limitation, the scope of the invention being, set forth in the following claims.

That which is claimed is:

1. A method of grouping a plurality of light emitters, comprising:
    selecting a first portion of the plurality of light emitters using a first region of a multiple axis color space that includes International Commission on Illumination (CIE) 1976 and that is configured to represent each of a plurality of colors as at least two chromaticity coordinates, the region proximate a predefined point on the multiple axis color space and comprising a major axis including a first length and a minor axis including a second length that is less than the first length; and
    selecting a plurality of other portions of the plurality of light emitters using a plurality of other regions and having a substantially similar size and shape as the first region, at least one of the plurality of other regions being adjacent the first region,
    wherein at least one of selecting the portion of the plurality of light emitters or selecting the plurality of other portions of the plurality of light emitters is performed using at least one processor,
    wherein the major axis is oriented substantially 10 degrees clockwise from a vertical axis of the multiple axis color space, and
    wherein the first region and the plurality of other regions correspond to a portion of the multiple axis color space in which chromaticity color coordinate u' is in a range of about 0.13 to about 0.30 and chromaticity coordinate v' is in a range of about 0.36 to about 0.55.

2. The method of claim 1, wherein the first region comprises hexagonal geometry.

3. The method of claim 1, wherein a ratio of the first length to the second length is in range from 1.3 to 2.3.

4. The method of claim 1, wherein a ratio of the first length to the second length comprises approximately 2.1.

5. The method of claim 1, wherein selecting the first portion of the plurality of light emitters comprises selecting the portion of the plurality of light emitters as a function of an application specific transmission characteristic.

6. The method of claim 5, wherein the application specific transmission characteristic includes a transmission characteristic of a display panel.

7. The method of claim 1, further comprising generating emitter spectral power distribution data for each of the plurality of light emitters and selecting one of the first region or the plurality of other regions corresponding to the emitter spectral power distribution of each of the plurality of light emitters.

8. The method of claim 1, wherein the plurality of light emitters comprise solid-state light emitters, incandescent lights and/or cold-cathode fluorescent lights.

9. A computer program product for grouping a plurality of light emitters, the computer program product comprising a non-transitory computer usable storage medium having computer readable program code embodied in the medium, the computer readable program code configured to carry out the method of claim 1.

10. A device, comprising:
a first portion of a plurality of light emitters, the first portion of the plurality of light emitters comprising a chromaticity difference maximum defined by a first region of a multiple axis color space that includes International Commission on Illumination (CIE) 1976 and that is configured to represent each of a plurality of colors as at least two chromaticity coordinates, the region proximate a predefined point on the multiple axis color space, the region comprising a major axis including a first length and a minor axis including a second length that is less than the first length,
wherein a plurality of other portions of the plurality of light emitters comprise a chromaticity difference maximum defined by respective ones of a plurality of other regions of the multiple axis color space,
wherein each of the plurality of other regions comprises a substantially similar geometry and orientation as the first region,
wherein the major axis is oriented at an angle that is substantially 10 degrees from a vertical axis of the multiple axis color space, and wherein the first region and the plurality of other regions correspond to a portion of the multiple axis color space in which chromaticity color coordinate u' is in a range of about 0.13 to about 0.30 and chromaticity coordinate v' is in a range of about 0.36 to about 0.55.

11. The device of claim 10, wherein the first region comprises an elliptical, rectangular and/or hexagonal geometry.

12. The device of claim 10, wherein a ratio of the first length to the second length is in range from 1.3 to 2.3.

13. The device of claim 10, wherein a ratio of the first length to the second length comprises approximately 2.1.

14. The device of claim 10, wherein a portion of the plurality of light emitters further comprise a maximum chromaticity difference defined as a function of an application specific transmission characteristic that corresponds to a filtering property of a transmissive component.

15. The device of claim 14, wherein the transmissive component comprises a display panel.

16. The device of claim 10, wherein each of the plurality of light emitters comprises spectral power distribution data and is grouped into one of the first region or the plurality of other regions corresponding to the spectral power distribution data.

17. The device of claim 10, wherein the plurality of light emitters comprise solid-state light emitters, incandescent lights and/or cold-cathode fluorescent lights.

18. Apparatus for grouping a plurality of light emitters, comprising:
a chromaticity module that is configured to estimate the spectral data corresponding to each of the plurality of light emitters;
a color space region definition module that is configured to define boundaries of a color space region of a multiple axis color space that includes International Commission on Illumination (CIE) 1976 and that is configured to represent each of a plurality of colors as at least two chromaticity coordinates, the color space region corresponding to a predefined point on the multiple axis color space and including a major axis including a first length and a minor axis including a second length that is less than the first length; and
a selection module that is configured to select at least one portion of a plurality of portions of the plurality of light emitters that corresponds to a respective one of a plurality of adjacent color space regions of the multiple axis color space,
wherein the plurality of portions of the plurality of light emitters comprise a chromaticity difference maximum defined by respective ones of the plurality of adjacent color space regions of the multiple axis color space,
wherein each of the plurality of regions comprises a substantially similar shape and orientation as the color space region in the multiple axis color space, and
wherein the major axis is oriented substantially 10 degrees clockwise from a vertical axis of the multiple axis color space.

19. The apparatus of claim 18, further comprising means for estimating front of screen (FOS) spectral data corresponding to each of the plurality of light emitters using the spectral data corresponding to each of the plurality of light emitters and a filtering property of a transmissive component, wherein the selection module is configured to select the portion of the plurality of light emitters that correspond to the color space region via the FOS spectral data of each of the plurality of light emitters.

20. A method of grouping a plurality of light emitters, comprising:
generating emitter raw spectral power distribution data for each of the plurality of light emitters;
estimating front of screen (FOS) spectral power distribution data for each of the plurality of light emitters from an application specific transmission characteristic corresponding to a filtering property of a transmissive component and the emitter raw spectral power data for each of the plurality of light emitters; and
grouping, using at least one processing device, each of the plurality of light emitters into one of a plurality of regions of a multiple axis color space that includes International Commission on Illumination (CIE) 1976 and that is configured to represent each of a plurality of colors as at least two chromaticity coordinates corresponding to the FOS spectral power distribution data of each of the plurality of light emitters, the region comprising a major axis that defines an angle of less than 45 degrees from a vertical axis of the multiple axis color space and including a first length and a minor axis including a second length that is less than the first length, the major axis oriented substantially different from the vertical axis of the multiple axis color space.

21. The method of claim 20, wherein the major axis is oriented substantially 10 degrees clockwise from the vertical axis of the multiple axis color space.

22. The method of claim 20, wherein a ratio of the first length to the second length is in range from 1.3 to 2.3.

23. The method of claim 20, wherein a ratio of the first length to the second length comprises approximately 2.1.

* * * * *

UNITED STATES PATENT AND TRADEMARK OFFICE
CERTIFICATE OF CORRECTION

PATENT NO. : 8,267,542 B2  
APPLICATION NO. : 12/126079  
DATED : September 18, 2012  
INVENTOR(S) : Roberts et al.

Page 1 of 1

It is certified that error appears in the above-identified patent and that said Letters Patent is hereby corrected as shown below:

Column 12, line 62: Please correct "values X′, Y′ and A′ (block 232)."
to read -- values X′, Y′ and Z′ (block 232). --

Column 15, Line 2: Please correct "color space and/or CIE 1976 L′, u′, v′"
to read -- color space and/or CIE 1976 L, u′, v′ --

Signed and Sealed this
Twelfth Day of March, 2013

Teresa Stanek Rea
*Acting Director of the United States Patent and Trademark Office*